US007818496B2

(12) United States Patent
Cooper et al.

(10) Patent No.: US 7,818,496 B2
(45) Date of Patent: Oct. 19, 2010

(54) PROCESSOR SYSTEM MANAGEMENT MODE CACHING

(75) Inventors: Barnes Cooper, Tigard, OR (US); Isaac Oram, Portland, OR (US); Kirk Brannock, Hillsboro, OR (US); Robert Gough, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 621 days.

(21) Appl. No.: 11/731,755

(22) Filed: Mar. 30, 2007

(65) Prior Publication Data

US 2008/0244191 A1    Oct. 2, 2008

(51) Int. Cl.
G06F 13/00 (2006.01)
G06F 12/00 (2006.01)
(52) U.S. Cl. ................... 711/104; 711/113; 711/156
(58) Field of Classification Search ............ 711/113, 711/104, 156
See application file for complete search history.

(56) References Cited

U.S. PATENT DOCUMENTS

| 4,715,013 | A | * | 12/1987 | MacGregor et al. | ......... 712/203 |
| 5,990,913 | A | * | 11/1999 | Harriman et al. | ............ 345/531 |
| 6,192,455 | B1 | | 2/2001 | Bogin et al. | |
| 6,745,296 | B2 | | 6/2004 | Chong | |
| 7,107,405 | B2 | * | 9/2006 | Lovelace | .................... 711/133 |
| 7,178,014 | B2 | | 2/2007 | Nalawadi et al. | |

* cited by examiner

*Primary Examiner*—Mardochee Chery
(74) *Attorney, Agent, or Firm*—Caven & Aghevli LLC

(57) ABSTRACT

In some embodiments, an apparatus comprises one or more processors supporting a system management mode, system management memory, and software controllable caching of memory, one or more memory modules, a memory controller, and a communication bus to couple the one or more memory modules to the memory controller. Other embodiments may be described.

20 Claims, 4 Drawing Sheets

PROCESSOR SYSTEM MANAGEMENT MODE CACHING

BACKGROUND

The subject matter described herein relates generally to the field of electronics and more particularly to processor system management mode caching.

System management random access memory (SMRAM) is a secure memory address space in a system memory of a computer system which stores processor status and system management interrupt (SMI) handlers. SMI handlers are software routines which perform various system management functions including system power control. The SMRAM is reserved for proprietary processing including processing of code used to update a basic input output system (BIOS) device. The BIOS device is responsible for booting a computer by providing a basic set of instructions and performing system start-up tasks. The BIOS device also provides an interface to the underlying hardware for the operating system in the form of a library of interrupt handlers, data tables and software interfaces.

BRIEF DESCRIPTION OF THE DRAWINGS

The detailed description is described with reference to the accompanying figures.

DETAILED DESCRIPTION

Described herein are exemplary systems and methods for processor system management mode caching in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
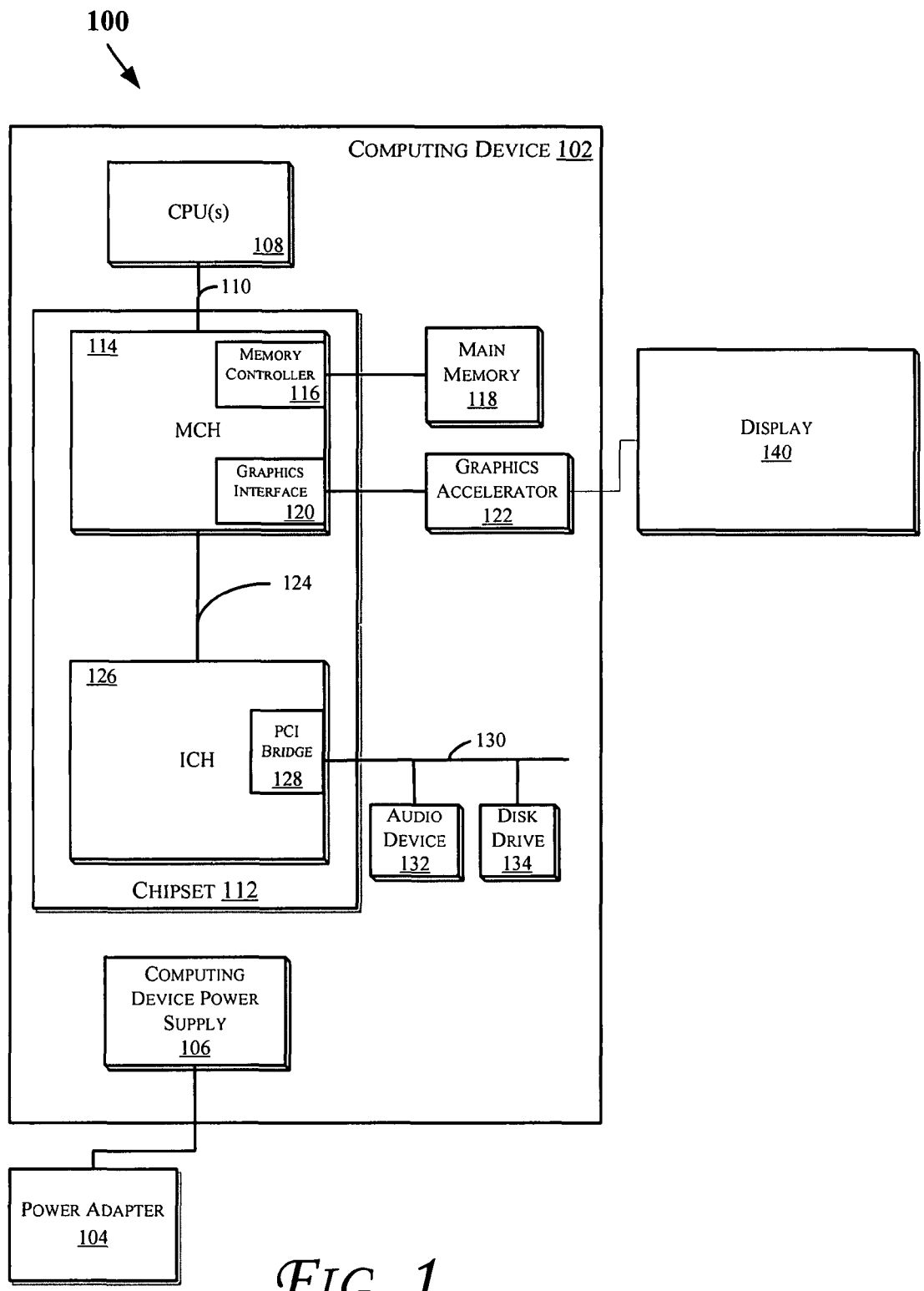
FIG. 1 is a schematic illustration of an exemplary computing device which may be adapted to implement processor system management mode caching in accordance with some embodiments.

FIG. 1 is a schematic illustration of a computer system 100 in accordance with some embodiments. The computer system 100 includes a computing device 102 and a power adapter 104 (e.g., to supply electrical power to the computing device 102). The computing device 102 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 102 (e.g., through a computing device power supply 106) from one or more of the following sources: one or more battery packs, an alternating current (AC) outlet (e.g., through a transformer and/or adaptor such as a power adapter 104), automotive power supplies, airplane power supplies, and the like. In some embodiments, the power adapter 104 may transform the power supply source output (e.g., the AC outlet voltage of about 10VAC to 240VAC) to a direct current (DC) voltage ranging between about 7VDC to 12.6VDC. Accordingly, the power adapter 104 may be an AC/DC adapter.

The computing device 102 may also include one or more central processing unit(s) (CPUs) 108 coupled to a bus 110. In some embodiments, the CPU 108 may be one or more processors in the Pentium® family of processors including, but not limited to, the Pentium® II processor family, Pentium® III processors, Pentium® IV processors available from Intel® Corporation of Santa Clara, Calif. Alternatively, other CPUs may be used, such as Intel's Itanium®, XEON™, and Celeron® processors, or Core™ processors. Also, one or more processors from other manufactures may be utilized. Moreover, the processors may have a single or multi core design.

A chipset 112 may be coupled to the bus 110. The chipset 112 may include a memory control hub (MCH) 114. The MCH 114 may include a memory controller 116 that is coupled to a main system memory 118. The main system memory 118 stores data and sequences of instructions that are executed by the CPU 108, or any other device included in the system 100. In some embodiments, the main system memory 118 includes random access memory (RAM); however, the main system memory 118 may be implemented using other memory types such as dynamic RAM (DRAM), synchronous DRAM (SDRAM), and the like. Additional devices may also be coupled to the bus 110, such as multiple CPUs and/or multiple system memories.

The MCH 114 may also include a graphics interface 120 coupled to a graphics accelerator 122. In some embodiments, the graphics interface 120 is coupled to the graphics accelerator 122 via an accelerated graphics port (AGP). In some embodiments, a display (such as a flat panel display) 140 may be coupled to the graphics interface 120 through, for example, a signal converter that translates a digital representation of an image stored in a storage device such as video memory or system memory into display signals that are interpreted and displayed by the display. The display 140 signals produced by the display device may pass through various control devices before being interpreted by and subsequently displayed on the display.

A hub interface 124 couples the MCH 114 to an input/output control hub (ICH) 126. The ICH 126 provides an interface to input/output (I/O) devices coupled to the computer system 100. The ICH 126 may be coupled to a peripheral component interconnect (PCI) bus. Hence, the ICH 126 includes a PCI bridge 128 that provides an interface to a PCI bus 130. The PCI bridge 128 provides a data path between the CPU 108 and peripheral devices. Additionally, other types of I/O interconnect topologies may be utilized such as the PCI Express™ architecture, available through Intel® Corporation of Santa Clara, Calif.

The PCI bus 130 may be coupled to an audio device 132 and one or more disk drive(s) 134. Other devices may be coupled to the PCI bus 130. In addition, the CPU 108 and the MCH 114 may be combined to form a single chip. Furthermore, the graphics accelerator 122 may be included within the MCH 114 in other embodiments.

Additionally, other peripherals coupled to the ICH 126 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 102 may include volatile and/or nonvolatile memory.

Figures 2, 3:
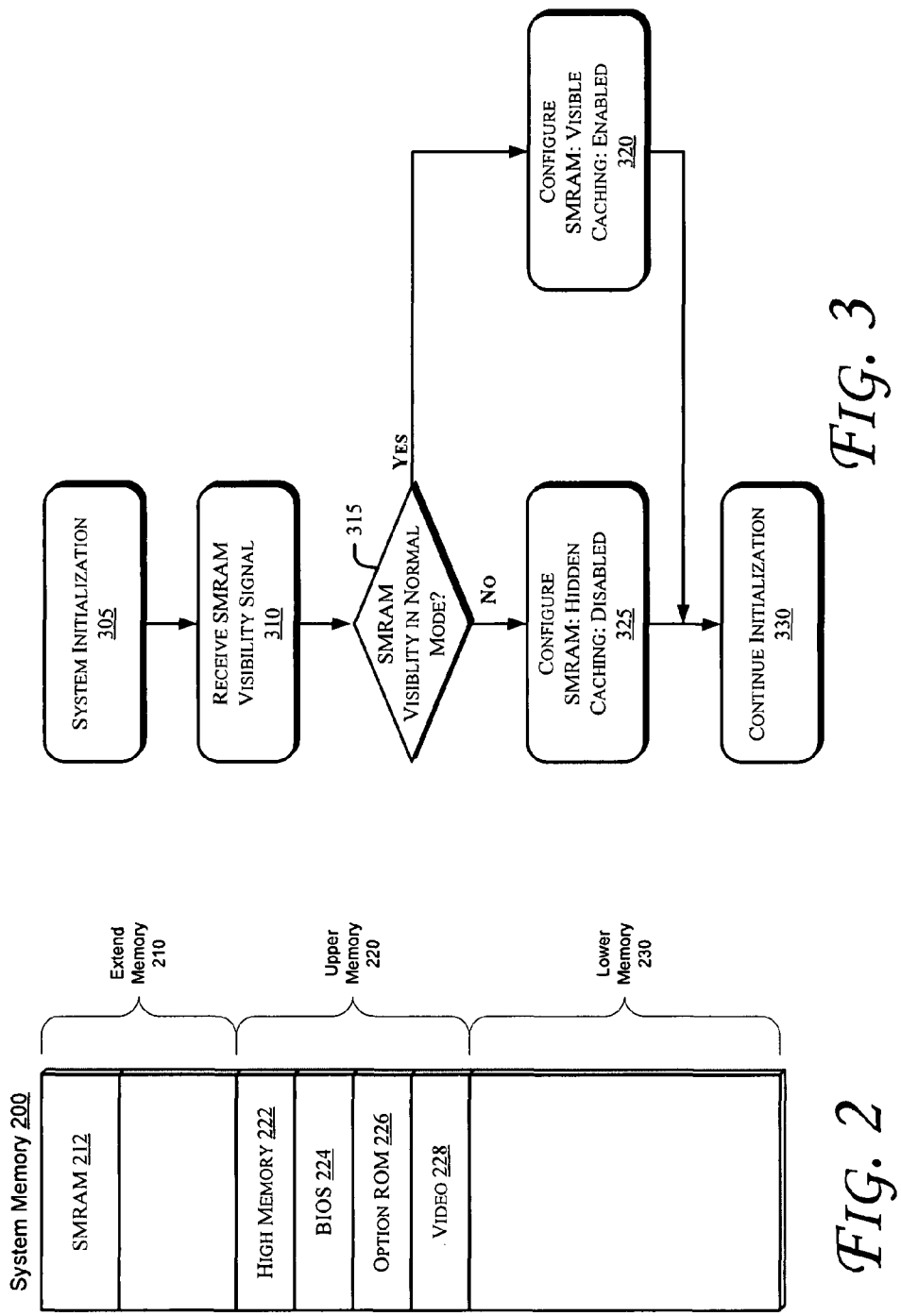
FIG. 2 is a schematic illustration of system memory in exemplary computing device which may be adapted to implement processor system management mode caching in accordance with some embodiments.
FIGS. 3-5 are flowcharts illustrating processor system management mode caching in accordance with some embodiments.

FIG. 2 is a schematic illustration of system memory 200 in a computing device which may be adapted to implement processor system management mode caching in accordance with some embodiments. In some embodiments, memory 200 may correspond to the main memory 118 depicted in FIG. 1. The memory 200 may be arranged or partitioned to have a lower memory (or system memory) 230, an upper memory 220, and an extended memory 210 containing system management random access memory (SMRAM) 212. In some embodiments system memory 200 may be greater than 1 megabyte in size.

In some embodiments, the lower memory 230 may be 640 kilobytes in size and the upper memory 220 may be 384 kilobytes in size. The size of extended memory 210 depends upon the number of DRAM chips used in the memory 200. Video RAM space 228 may be located in the upper memory 220 just above the lower memory 230.

Option read only memory (ROM) space 226 is allocated above the video RAM space 228. BIOS memory space 224 for the basic input/output system (BIOS) is allocated above the option ROM space 226. In some embodiments video RAM space 228 plus the option ROM space 226 plus the BIOS memory space 224 measures 384 kilobytes. The option ROM space 226 and the BIOS memory space 224 are hardware addressable.

Figure 4:
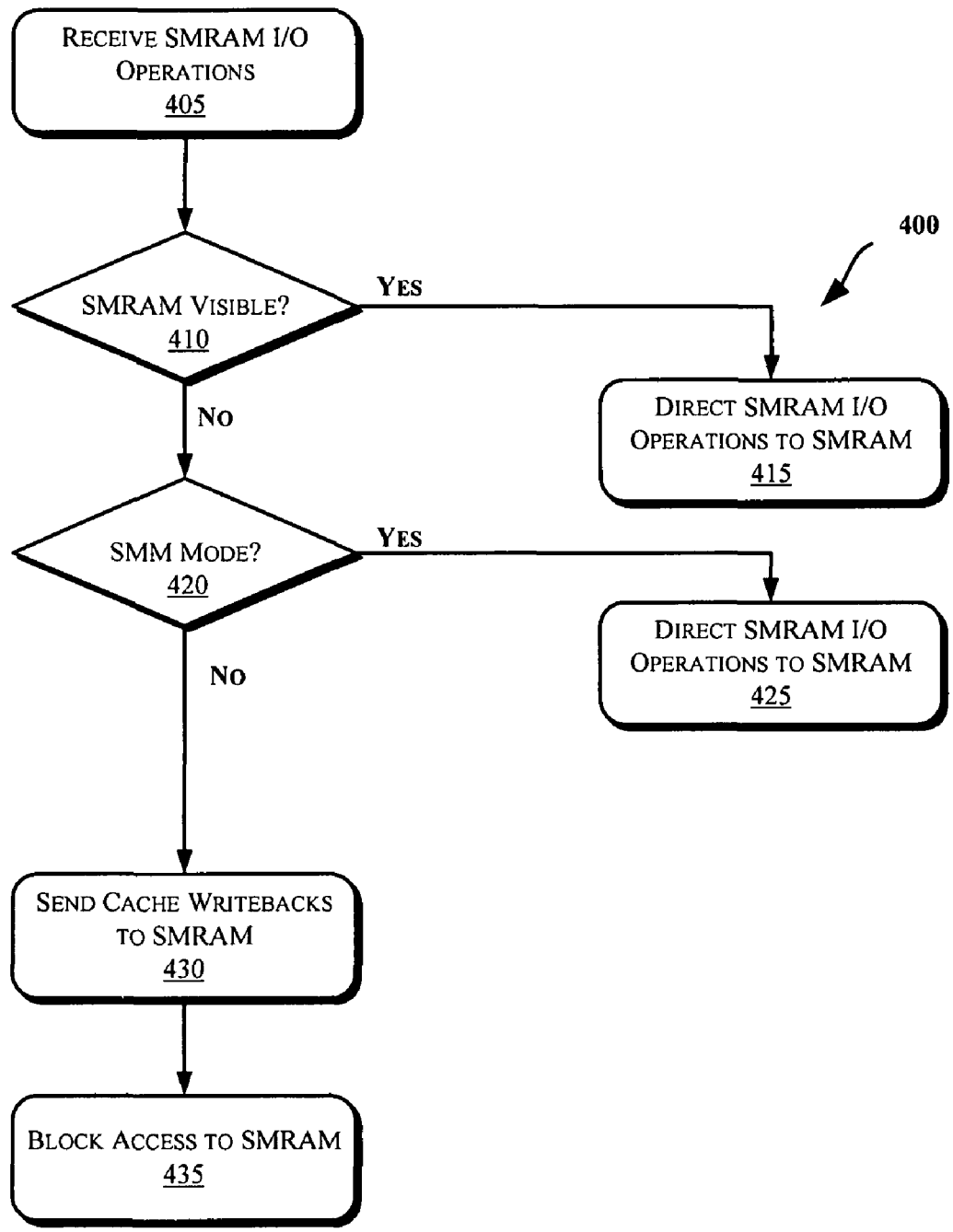
Figure 5:
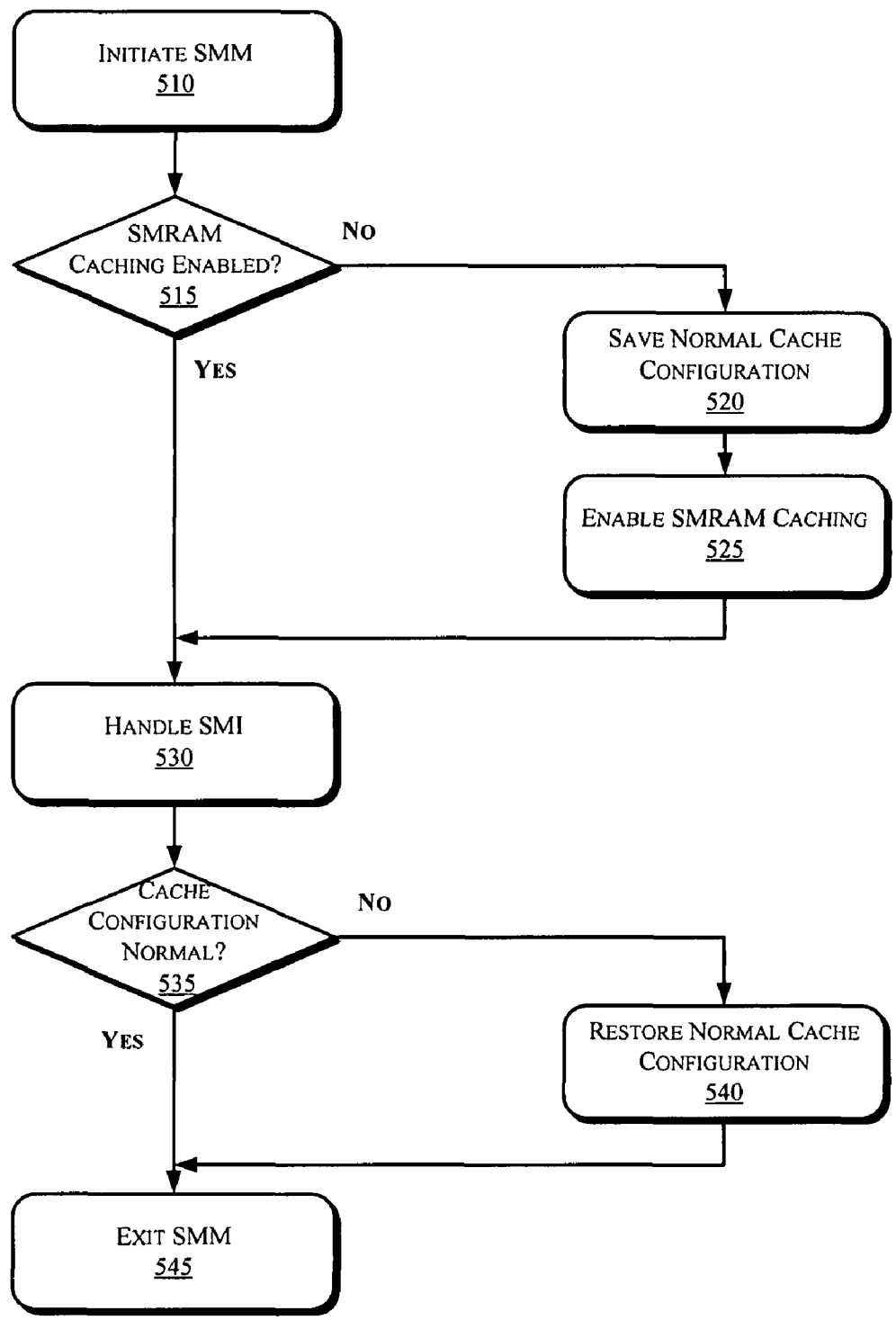

Extended memory 210 comprises SMRAM 212. The memory 200 and provide for cacheable SMRAM 212. In some embodiments, the SMRAM 212 may be secured when the operating outside of SMM. FIGS. 3-5 are flowcharts illustrating processor system management mode caching in accordance with some embodiments. In some embodiments, the operations depicted in FIGS. 3-5 may be implemented as logic instructions stored in a computer-readable medium. The logic instructions may be executed on a processor such as CPU 108 or on a controller such as memory controller 116.

FIG. 3 is a flowchart illustrating an overview of operations which may be implemented by the processor 108 of computer system 100 to implement processor system management code caching. Referring first to FIG. 3, at operation 305 the computer system 100 initialization begins. At operation 310 an SMRAM visibility signal is received. For example, in some embodiments the system BIOS 224 may present an SMRAM visibility option on a user interface on display 140. A user of computer system may input an SMRAM visibility signal into computer system 100. In some embodiments, this parameter is configurable once, e.g. during boot operations.

If, at operation 315, the SMRAM visibility signal indicates that the SMRAM is to be visible when computer system 100 operates in normal mode, then control passes to operation 320 and the SMRAM is configured to be visible when the computer system 100 operates in normal mode and SMRAM caching is enabled. By contrast, if at operation 315 the SMRAM signal indicates that the SMRAM is to be hidden when the computer system 100 is in normal mode, then control passes to operation 325 and the SMRAM is configured to be hidden when computer system 100 is in normal mode and SMRAM is uncached. At operation 330 computer initialization is continued.

In some embodiments the memory controller 116 may implement operations for processor system management mode caching. FIG. 4 is a flowchart which provides an overview of operations. Referring to FIG. 4, at operation 405 an SMRAM input/output (I/O) operation is received. If at operation 410 the SMRAM is in a visible mode, then control passes to operation 415 and SMRAM input/output operations are directed to the SMRAM. By contrast, if at operation 410 the SMRAM is not in a visible mode, then control passes to operation 420.

If, at operation 420, the computer system is in a system management mode (SMM), then control passes to operation 425 and SMRAM input/output operations are directed to SMRAM. By contrast, if at operation 420 the computer system is not in a system management mode (e.g., if the system is in normal mode), then control passes to operation 430 and cache writebacks are sent to SMRAM, and at operation 435 and access for other I/O operations to SMRAM is blocked.

FIG. 5 is a flowchart which provides an overview of operations when the computer system is in a system management mode (SMM). In some embodiments, the operations of FIG. 5 may be implemented by memory controller 116. Referring to FIG. 5, at operation 510 system management mode is initiated, e.g., via a system management interrupt (SMI). If, at operation 515, SMRAM caching is not enabled, then control passes to operation 520 and the normal cache configuration is saved, and at operation 525 SMRAM caching is enabled. Control then passes to operation 530 and the SMI that initiated the SMM is handled.

If, at operation 535 the cache configuration is not normal, then control passes to operation 540 and the normal cache configuration is restored. Control then passes to operation 545 and the SMM is exited. Table I illustrates valid cache configuration combinations.

TABLE I

| SMRAM Visibility Outside SMM | Valid Cache Configuration Options Outside SMM | Valid Cache Configuration Options In SMM |
| --- | --- | --- |
| Visible | System Memory: WB, WP, WT, UC<br>SMRAM: WB, WP, WT, UC | System Memory: WB, WP, WT, UC<br>SMRAM: WB, WP, WT, UC |
| Not Visible | System Memory: WB, WP, WT, UC<br>SMRAM: UC | System Memory: WB, WP, UC<br>SMRAM: WB, WP, WT, UC |

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

For example, in some embodiments a computer program product may comprise logic instructions stored on a computer-readable medium which, when executed, configure a controller to detect whether a system management memory module is in a visible state, in response to a determination that system management memory is in a visible state, direct one or more system management memory input/output operations to a system management memory module, and in response to a determination that system management memory is in an invisible state, direct system management memory cache write back operations to the system management memory module and direct other system management memory input/output operations to another location in a system memory.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
   one or more processors supporting a system management mode, system management memory, and software controllable caching of memory;
   one or more memory modules;
   a memory controller;
   a communication bus to couple the one or more memory modules to the memory controller; and
   logic to:
   detect whether a system management memory module is in a visible state;
   in response to a determination that system management memory is in a visible state, direct system management memory input/output operations to the system management memory module; and
   in response to a determination that system management memory is in an invisible state, direct system management memory cache write back operations to the system management memory module and directing other system management memory input/output operations to another location in system memory.

2. The apparatus of claim 1, further comprising logic to examine a system management memory configuration parameter.

3. The apparatus of claim 1, further comprising logic to:
   detect whether a system management memory module should be configured to be in a visible state;
   in response to a determination that system management memory should be in a visible state, configure system management memory to be visible and configure system management memory to be cached by the processor(s); and
   in response to a determination that system management memory should be in an invisible state, configure system management memory to be invisible and configure system management memory to not be cached by processor(s).

4. The apparatus of claim 1, further comprising logic to:
   initiate a system management mode operation;
   detect whether system management memory module caching is enabled;
   in response to a determination that system management memory caching is not enabled;
   save a normal cache configuration; and
   enable system management memory module caching.

5. The apparatus of claim 4, further comprising logic to implement the system management mode operation.

6. The apparatus of claim 4, further comprising logic to:
   detect whether a current cache configuration is different from the normal cache configuration; and
   in response to a determination that a current cache configuration is different from the normal cache configuration, restore the normal cache configuration.

7. The apparatus of claim 1, further comprising logic to:
   associate one or more configuration parameters with the system management memory module during a system initialization process.

8. A method to manage system management memory input/output operations, comprising:
   detecting whether a system management memory module is in a visible state;
   in response to a determination that system management memory is in a visible state, directing system management memory input/output operations to the system management memory module; and
   in response to a determination that system management memory is in an invisible state, directing system management memory cache write back operations to the system management memory module and directing other system management memory input/output operations to another location in system memory.

9. The method of claim 8, wherein detecting whether a system management memory module is in a visible state comprises examining a system management memory configuration parameter.

10. The method of claim 8, further comprising:
initiating a system management mode operation;
detecting whether system management memory module caching is enabled;
in response to a determination that system management memory caching is not enabled:
saving a normal cache configuration; and
enabling system management memory module caching.

11. The method of claim 10, further comprising implementing the system management mode operation.

12. The method of claim 11, further comprising:
detecting whether a current cache configuration is different from the normal cache configuration; and
in response to a determination that a current cache configuration is different from the normal cache configuration, restoring the normal cache configuration.

13. The method of claim 8, further comprising:
associating one or more configuration parameters with the system management memory module during a system initialization process.

14. A computer program product comprising logic instructions stored on a non-transitory computer-readable medium which, when executed, configure a controller to:
detect whether a system management memory module is in a visible state; in response to a determination that system management memory is in a visible state, direct one or more system management memory input/output operations to a system management memory module; and
in response to a determination that system management memory is in an invisible state, direct system management memory cache write back operations to the system management memory module and direct other system management memory input/output operations to another location in a system memory.

15. The computer program product of claim 14, further comprising logic instructions stored on a non-transitory computer readable medium which, when executed, configure a controller to examine a system management memory configuration parameter.

16. The computer program product of claim 14, further comprising logic instructions stored on a non-transitory computer readable medium which, when executed, configure a controller to:
detect whether a system management memory module should be configured to be in a visible state;
in response to a determination that system management memory should be in a visible state, configure system management memory to be visible and configure system management memory to be cached by the processor(s); and
in response to a determination that system management memory should be in an invisible state, configure system management memory to be invisible and configure system management memory to not be cached by processor(s).

17. The computer program product of claim 14, further comprising logic instructions stored on a non-transitory computer readable medium which, when executed, configure a controller to:
initiate a system management mode operation; detect whether system management memory module caching is enabled;
in response to a determination that system management memory caching is not enabled: save a normal cache configuration; and enable system management memory module caching.

18. The computer program product of claim 14, further comprising logic instructions stored on a non-transitory computer readable medium which, when executed, configure a controller to implement the system management mode operation.

19. The computer program product of claim 17, further comprising logic instructions stored on a non-transitory computer readable medium which, when executed, configure a controller to:
detect whether a current cache configuration is different from the normal cache configuration; and
in response to a determination that a current cache configuration is different from the normal cache configuration, restore the normal cache configuration.

20. The computer program product of claim 14, further comprising logic instructions stored on a non-transitory computer readable medium which, when executed, configure a controller to:
associate one or more configuration parameters with the system management memory module during a system initialization process.

* * * * *

UNITED STATES PATENT AND TRADEMARK OFFICE
CERTIFICATE OF CORRECTION

PATENT NO. : 7,818,496 B2
APPLICATION NO. : 11/731755
DATED : October 19, 2010
INVENTOR(S) : Barnes Cooper et al.

It is certified that error appears in the above-identified patent and that said Letters Patent is hereby corrected as shown below:

In drawing sheet 2 of 4, figure 3, in reference numeral 315, line 2, delete "VISIBLITY" and insert --, VISIBILITY --, therefor.

In column 6, line 8, in claim 1, delete "directing" and insert -- direct --, therefor.

Signed and Sealed this
Eighth Day of March, 2011

David J. Kappos
*Director of the United States Patent and Trademark Office*